June 21, 1966      R. B. LEWIS      3,257,154

CONTAINER

Filed March 25, 1964      3 Sheets-Sheet 1

INVENTOR.
Robert B Lewis,
BY

June 21, 1966  R. B. LEWIS  3,257,154
CONTAINER
Filed March 25, 1964  3 Sheets-Sheet 2
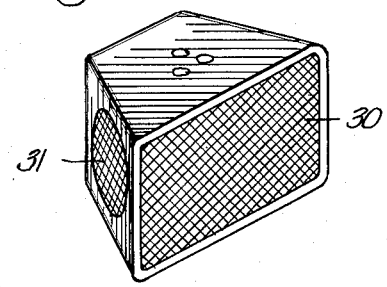
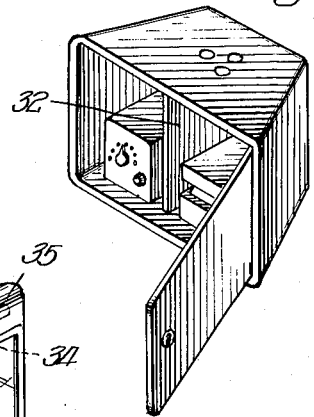
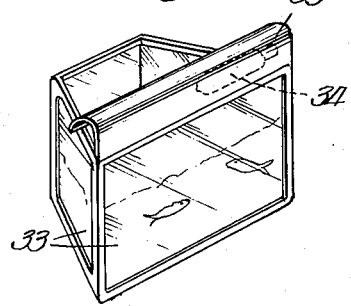
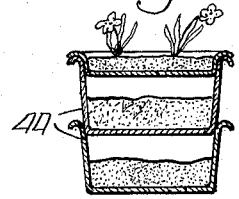
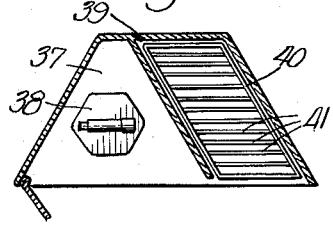
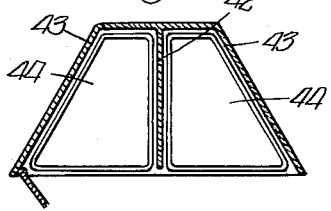
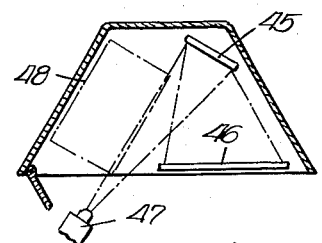
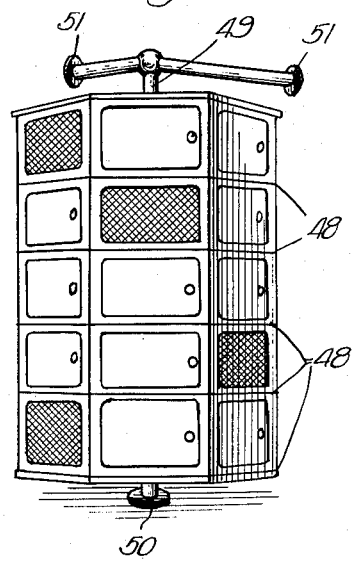
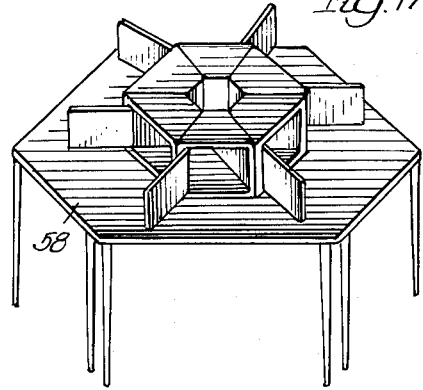
INVENTOR.
Robert B Lewis,
BY June 21, 1966  R. B. LEWIS  3,257,154
CONTAINER
Filed March 25, 1964  3 Sheets-Sheet 3
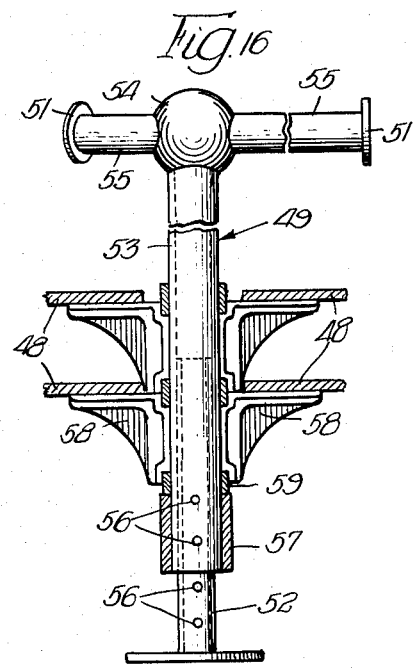
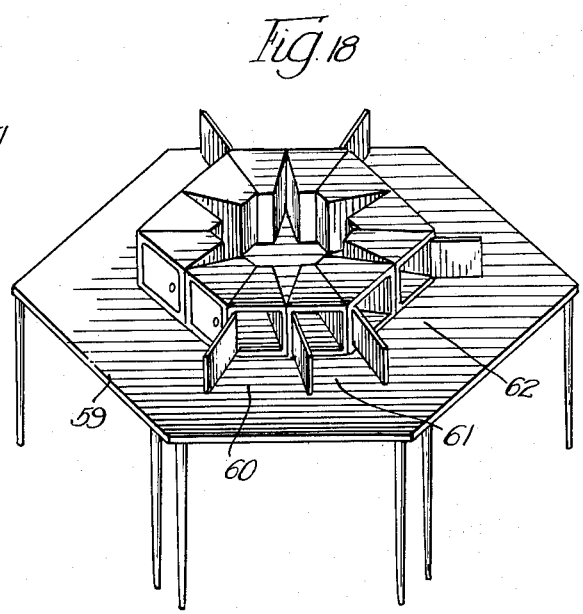
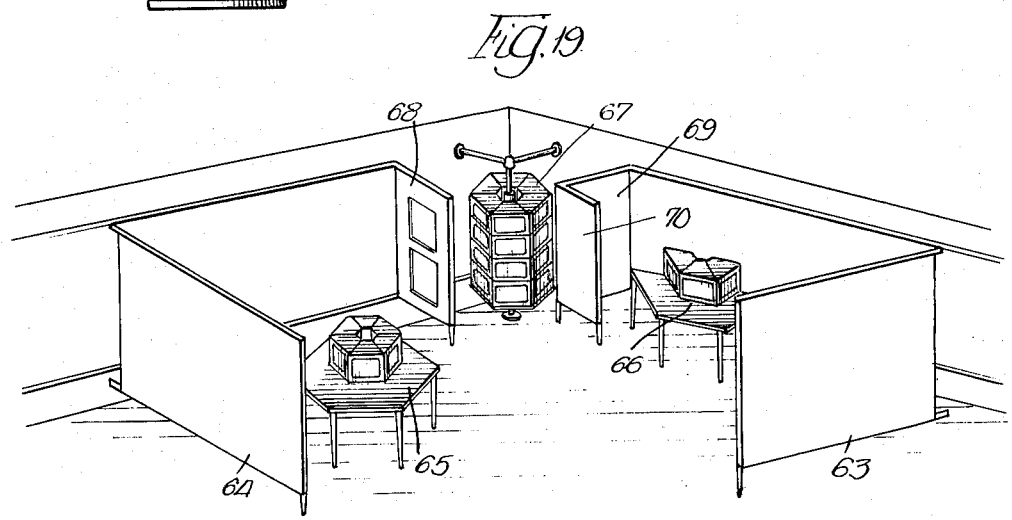
INVENTOR.
Robert B. Lewis,
BY

United States Patent Office

3,257,154
Patented June 21, 1966

3,257,154
CONTAINER
Robert B. Lewis, P.O. Box 262, Aspen, Colo.
Filed Mar. 25, 1964, Ser. No. 354,610
5 Claims. (Cl. 312—198)

This invention relates to a new and useful container which is especially adapted for use in storing various types of materials such as may be employed in teaching science students.

The container of this invention is adapted to be used in various different forms, and is characterized as having a unique shape which permits it to provide an adequate storage facility of the type referred to, and, at the same time, to be stored in relatively large numbers in a minimum of space. In addition, the shape is such that the units collectively may be associated in a multiplicity of arrangements so as to present the contents of the containers in convenient accessibility for use by the students.

In addition, the container is adapted to be readily carried from place-to-place by the students or to be permanently mounted in association with any number of similar containers so that accessibility to the contents may be achieved with ease.

Whereas, the container of this invention may be suitable for any number of different uses, it is contemplated that it will be used to great advantage as a teaching facility in classrooms and similar places of learning. The containers may be constructed so as to serve well in teaching science classes, and to serve as individual storage facilities for the instruments, specimens, and the like to be used by each individual student.

In certain instances, the containers will serve as merely storage devices, whereas, in other instances, they may provide a container for preserving an environment or habitat for the safekeeping of biological specimens such as plants, insects, animals, and the like.

Accordingly, it is an object of this invention to provide a new and improved container of the type referred to, which is portable and of such shape as to permit a multiplicity of useful arrangements, when used in large numbers, all of which provide desirable and useful displays and facilities for the individual students or for an entire class of students, respectively.

Other objects are contemplated for this invention, as will be apparent to one skilled in the art as the following description proceeds.

In the accompanying drawings:

FIGURE 8 is a perspective view showing a container of this invention with a front screen or viewing window;

FIGURE 9 is a view similar to FIGURE 2 but showing an internal partition forming compartments in the container for facilitating storage of various items;

FIGURE 10 shows a container of this invention with its side walls made of glass or similar transparent material so as to provide an aquarium, or the like;

FIGURE 11 is a plan view and cross section showing a suitable arrangement for accommodating science materials, such as a microscope and slide trays, in a container of this invention;

FIGURE 12 is a plan view and cross section showing a modified internal construction for accommodating trays in a container of this invention;

FIGURE 13 is a plan view and cross section showing how the trays employed may be nested for space conservation;

FIGURE 14 is a plan view and cross section of a further modified internal arrangement in a container of this invention to provide both storage and a mode of utilization of a frosted screen, mirror, and projector;

FIGURE 15 is a perspective view of a storage device consisting of a plurality of rotary shelves mounted on a vertical axis and supporting a plurality of containers of this invention, the storage device being supported on the floor and held at the top from the wall by angularly disposed brackets;

FIGURE 16 is a view in elevation of the supporting device employed in the construction shown in FIGURE 15;

FIGURE 17 is a prespective view of a study carrel showing a cluster of six of the containers of this invention arranged on a hexagonal supporting table;

FIGURE 18 is a view similar to FIGURE 17 but showing twelve containers of this invention, instead of six, arranged so as to present either one or two containers for use by a single student, depending upon the door hinging arrangement;

FIGURE 19 is a perspective view illustrating an arrangement of classroom or other work space employing a plurality of differently arranged assemblies of the containers constituting this invention.

Figure 1:
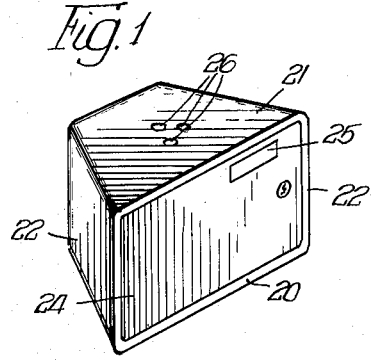
FIGURE 1 is a perspective view of a container, constructed in accordance with this invention, which has a hinged door on the front face thereof.
Figure 2:
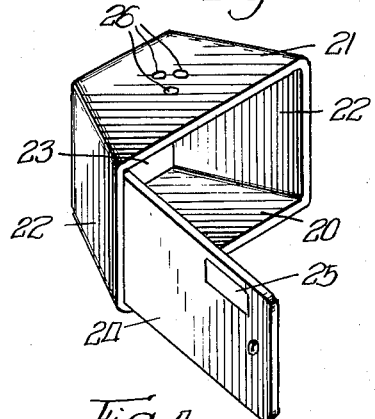
FIGURE 2 is a view, similar to FIGURE 1, showing the same device with the door open.

As best shown in FIGURES 1 and 2, one preferred example of a container constructed in accordance with this invention comprises a floor or bottom 20, a top 21, side walls 22, and a rear wall 23. The top and bottom are preferably disposed in parallel planes, whereas, the side walls 22 are angularly disposed so as to converge towards the rear of the container. In this illustrated example, the side walls are each disposed at a 60 degree angle with respect to the face opening of the container whereby the top and bottom are in the shape of a truncated isosceles triangle. The open face of the container may be closed by a hinged door or the like 24, which may have means such as a reference card holder 25 on its outer surface for noting the contents or nature of the environment contained inside.

Figure 7:
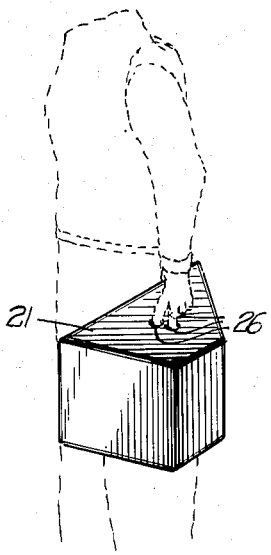
FIGURE 7 illustrates how a container of this invention may be carried by a suitable gripping provision.

In order that the containers may be readily carried, suitable gripping means such as a plurality of finger openings 26 may be provided in the top thereof so that the containers may be gripped and carried in the manner illustrated in FIGURE 7. If other forms of gripping means are utilized, such as handles or the like, it would be preferable to have any protruding type of handle mounted in a recess so that the top surface of the container is flush to enable a plurality of containers to be stacked one on top of the other. It is also contemplated that similar gripping means may be provided on the underside of the floor so that the containers may be mounted with either the floor or top uppermost so as to vary the side on which the door hinge appears.

Figure 3:
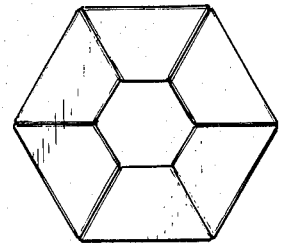
FIGURE 3 is a diagrammatic plan view showing how six containers of this invention, by virtue of their angular sides, may be arranged to form a hexagon with their open or display faces facing outwardly.
Figure 4:
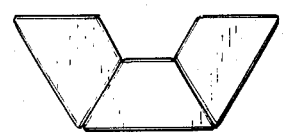
FIGURE 4 is a diagrammatic plan view showing an arrangement of containers of this invention in a cluster of three, such as might be mounted on a table or shelf.
Figure 5:
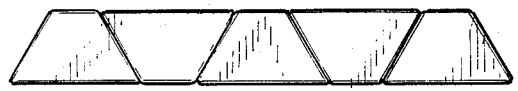
FIGURE 5 is a diagrammatic plan view showing an arrangement of the containers of this invention in a straight line assembly.

It is understood that the containers described may be fabricated of any suitable material, such as wood, metal, or plastic. In addition, the angularity of the side walls may be selected to enable the particular polygonal arrangement desired. In the illustrated instance, the containers provided with 60 degree angles may be clustered or grouped to form a hexagon in the manner illustrated in FIGURE 3, or a trapezoidal figure as illustrated in FIGURE 4. Also, it will be noted that alternate containers may be positioned to present their open faces in opposite directions, which permits a plurality of the containers to be grouped in a straight line disposition as illustrated in FIGURE 5.

Figure 6:
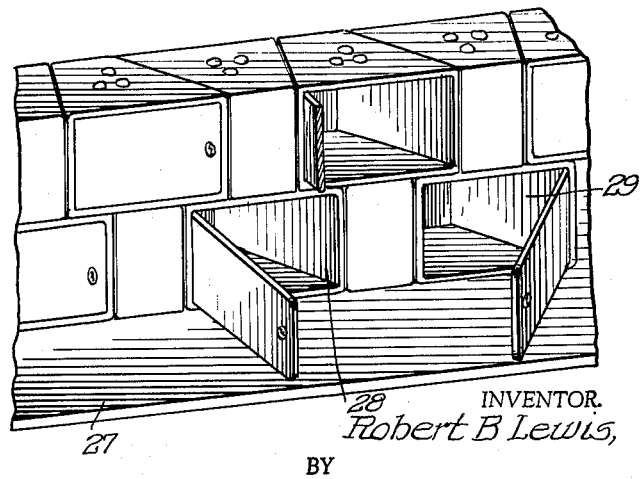
FIGURE 6 is a perspective view showing the containers of this invention arranged in a straight line assembly with one tier on top of the other, and with certain individual containers inverted to bring the door hinge on the opposite side.

As shown in FIGURE 6, the containers may be arranged in a straight line position in several tiers, with the alternate containers in each tier disposed in opposite directions, and preferably mounted on a supporting surface or table 27. In this assembly, it will be noted that the containers designated 28 and 29, respectively, have been mounted so that one is inverted in relation to the other, with the result that the door of the container 28 is disposed on the left-hand side whereas the door on the container 29 is disposed on the right-hand side. It will be noted that the doors referred to, when in open position as illustrated, will serve as partitions between adjacent work areas so as to provide an element of privacy for each student or worker.

The container illustrated in FIGURE 8 is slightly modified to provide a front screen 30 and a screened access door 31. This particular container is adapted to provide an enclosure for small animals, such as mice or the like, which may be readily observed through the screen-covered front opening. The animals, as well as food, water, and other materials, may be introduced into the container through the access door 31. If preferred, the front screen 30 may be replaced by a glass or other transparent plate or sheet so as to form an adequate barrier against escape of the animals, while, at the same time, providing ready visibility of the interior of the container.

FIGURE 9 illustrates a slightly modified container with an internal partition 32 forming compartments for housing materials in making scientific experiments, such as chemicals and equipment for chemical experimentation.

FIGURE 10 illustrates a modified form of container having one or more upright walls of glass 33, and preferably with an open top, so as to provide an aquarium. A lamp 34 and reflector 35 may be attached to provide illumination of the interior. This container will be formed in the same general trapezoidal shape as the other containers so as to be used therewith in any assembly in the manner previously described.

FIGURE 11 illustrates a modified form of container having a diagonally disposed vertical partition 36 defining a space 37 for accommodating a device, such as a microscope 38, and a second space 39 for accommodating ancillary equipment such as a storage tray 40 for slides 41. A further modified form is illustrated in FIGURE 12 wherein a central partition 42 is provided so as to define two areas 43 for receiving trays 44. The trays 44 may be constructed, as shown in FIGURE 13, so that a plurality thereof may be nested for the conservation of space or utilized to house growing specimens such as illustrated in FIGURE 13.

Modified form of container illustrated in FIGURE 14 is equipped with a mirror 45, a frosted screen 46 and a projector 47 (partially shown). The projector 47 is adapted to be housed in the container in the space represented by the dotted line 48, and then removed therefrom and placed on a work table in front of the container in a position to project the image of the slides on to the mirror 45 and thence on to the frosted screen 46 for viewing by the operator.

FIGURE 15 illustrates a storage system for a plurality of tiers of hexagonal assemblies of this invention. In this case, each tier is mounted on a rotating supporting platform 48 which are preferably circular or hexagonal in shape. The platforms 48 are vertically spaced and mounted on a center post 49 which may be supported at its base by a suitable bracket 50 mounted on the floor, and at its top by a plurality of brackets 51 supported from the wall of the room.

One preferred embodiment of the supporting device for the FIGURE 15 storage system is illustrated in FIGURE 16. In this example, the center post 49 is comprised of an inner tubular member 52 which is welded to the floor bracket 50, and extends upwardly therefrom, and an outer tubular member 53 which is adapted to be slipped over the inner member 52 as shown. At its top, the outer tubular member 53 is welded to a spherical joint element 54. Two support arms 55 angularly extend in a horizontal plane from the spherical joint element 54. The wall brackets 51 are welded to the outer ends of the arms 55. If desired, the brackets 51 may be affixed to the arms 55 by a vertical pin or other means to permit angular movement of the brackets 51 to conform to particular installation requirements.

Returning to the support post 49, it is seen that the inner tubular member 52 and the lower portion of the outer tubular member 53 are each provided with regularly spaced apertures 56 which may be variously aligned to receive an adjustment of the height of the center post 49. If desired, the support arms 55 may be similarly constructed to enable length adjustment.

The rotary shelves 48 for the containers are supported by a tubular spacing member 57 and are also provided with apertures (not shown) which may be variously aligned with the apertures 56 for reception of the adjustment pin. The shelf brackets 58 are immediately supported by bearing rings 59 to enable rotation of the container shelves 48. Additional tubular spacing members (not shown) may be provided to adjust the vertical distance between adjacent shelves 48. Although the supporting device described may be constructed of a variety of materials it is considered preferable to utilize largely aluminum fabrication in order to minimize weight.

It will be apparent that the storage system of FIGURE 15 may be employed merely for temporary storage of the containers during the interval between study periods or use, or it may provide a permanent accommodation for a plurality of storage containers in a rotary assembly for display and study.

FIGURE 17 illustrates a hexagonal assembly of containers mounted on a hexagonal table 58 with the doors of the respective containers disposed to provide partitions separating each work area.

FIGURE 18 illustrates a similar arrangement of containers, but in this case twelve are employed on an enlarged hexagonal table 59 with two containers disposed with their open faces in a common plane parallel to one of the straight edges of the table. In this arrangement, two work areas may be provided for each straight line face of the table, as shown at 60 and 61, with the doors serving as separating partitions, or a pair of containers may be associated to provide a single work area, as at 62.

FIGURE 19 illustrates a typical study area for a school or the like, which is defined by a partition 63 and a second partition 64 in which is arranged a table and hexagonal assembly of containers 65 of the type illustrated in FIGURE 17, a trapezoidal table, an assembly of containers 66 disposed in the manner illustrated in FIGURE 4, and a storage system, represented generally at 67, of the construction illustrated in FIGURE 15. The storage system is mounted behind partitions 67 and 68, and may be completely hidden from view by a door 70.

It is apparent that many other combinations and arrangements of the containers and supporting tables and platforms therefor may be provided and successfully utilized to provide safe and adequate storage for specimens and instrumentalities employed in teaching science and other subjects.

What is claimed is:

1. A storage and display device comprising a vertical support member, a plurality of hexagonal shelves mounted for independent rotation on said vertical support member in vertically-spaced relationship, and a plurality of containers disposed on each of said shelves and slidably removable therefrom, said containers comprising a floor, a back wall, and a pair of side walls, said floor having a trapezoidal shape and said side walls converging toward said back wall so as to define an angle of 60° and such that said plurality of containers on each of said shelves are arranged in side-to-side contact to form a regular hexagonal assembly with each of said containers facing outwardly and with the front face of each of said containers in parallel relationship with an associated front edge of one of said hexagonal shelves.

2. A work and study center comprising a supported work surface and a plurality of containers disposed on said work surface and slidably removable therefrom, each of said containers comprising a pair of congruent trapezoidal portions disposed in alignment in vertically-spaced parallel planes, a back wall, a front portion, a door hinged on a vertical side of said front portion, and a pair of side walls converging toward said back wall and enclosing an angle of 60°, said work surface extending outwardly beyond said front portions of said containers, said containers being arranged in side-to-side relationship so as to form a geometric configuration in which the doors of preselected containers open in preselected directions so as to provide work area partitions with respect to said work surface.

3. The work and study center as defined in claim 2 wherein said work surface is of hexagonal shape and wherein said containers are arranged in side-to-side contact to form a hexagonal arrangement with the front face of each of said containers in parallel relationship with an associated front edge of said hexagonal work surface and in which the door of said preselected containers are positionable in substantial alignment with the diagonals of said hexagonal surface so as to provide work sector partitions.

4. A work and study center comprising a supported rectangular work surface and a plurality of containers disposed on said work surface and slidably removable therefrom, each of said containers comprising a pair of congruent trapezoidal portions disposed in alignment in vertically-spaced parallel planes, a back wall, a front portion, a door hinged on a vertical side of said front portion, and a pair of side walls converging toward said back wall, said work surface extending outwardly beyond said front portions of said containers, said containers being arranged in side-to-side contact in straight line disposition with alternate containers facing in opposite directions and with the front face of each of said containers in parallel relationship with an associated edge of said work surface such that the doors of preselected containers are positionable in a direction transversely of the rectangular work surface so as to provide work area partitions with respect to said work surface.

5. The work and study center as defined in claim 4 wherein said straight line disposition of containers is multi-tiered.

References Cited by the Examiner

UNITED STATES PATENTS

| | | | |
|---|---|---|---|
| 986,395 | 3/1911 | King | 312—111 X |
| 1,330,181 | 2/1920 | Gibbs | 312—285 X |
| 1,576,802 | 3/1926 | Alfrey | 312—285 X |
| 2,711,741 | 6/1955 | Wassell | 108—61 X |
| 2,769,211 | 11/1956 | Hewitt | 20—3.5 |
| 2,847,265 | 8/1958 | Kulik | 312—198 X |
| 2,933,361 | 4/1960 | Von Der Lancken | 312—252 X |
| 2,970,874 | 2/1961 | Honeycutt | 312—258 X |
| 3,111,221 | 11/1963 | Chapman | 206—65 |

FOREIGN PATENTS

| | | |
|---|---|---|
| 548,940 | 7/1956 | Belgium. |
| 814,511 | 7/1951 | Germany. |

CLAUDE A. LE ROY, *Primary Examiner.*

CHANCELLOR E. HARRIS, FRANK B. SHERRY,
*Examiners.*